(12) United States Patent
Sayana et al.

(10) Patent No.: US 9,094,841 B2
(45) Date of Patent: Jul. 28, 2015

(54) DETERMINATION OF CHANNEL QUALITY INFORMATION IN ADVANCED ANTENNA SYSTEMS

(71) Applicant: Samsung Electronics Co., LTD, Suwon-si, Gyeonggi-do (KR)

(72) Inventors: Krishna Sayana, San Jose, CA (US); Boon Loong Ng, Dallas, TX (US); Jianzhong Zhang, Plano, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 136 days.

(21) Appl. No.: 13/856,306

(22) Filed: Apr. 3, 2013

(65) Prior Publication Data
US 2013/0265899 A1 Oct. 10, 2013

Related U.S. Application Data

(60) Provisional application No. 61/620,312, filed on Apr. 4, 2012.

(51) Int. Cl.
| | |
|---|---|
| *H04L 12/26* | (2006.01) |
| *H04W 24/00* | (2009.01) |
| *H04W 72/04* | (2009.01) |
| *H04B 7/02* | (2006.01) |
| *H04B 7/04* | (2006.01) |
| *H04B 7/06* | (2006.01) |

(52) U.S. Cl.
CPC ............. *H04W 24/00* (2013.01); *H04B 7/02* (2013.01); *H04B 7/0452* (2013.01); *H04B 7/0456* (2013.01); *H04B 7/063* (2013.01); *H04B 7/0626* (2013.01); *H04B 7/0632* (2013.01); *H04B 7/0639* (2013.01); *H04W 72/046* (2013.01)

(58) Field of Classification Search
CPC ....... H04W 24/00; H04W 72/046; H04B 7/02
USPC ........................................................ 370/252
See application file for complete search history.

(56) References Cited

U.S. PATENT DOCUMENTS

| | | | |
|---|---|---|---|
| 2008/0233965 | A1 | 9/2008 | Kent et al. |
| 2008/0260058 | A1 | 10/2008 | Li |
| 2010/0157924 | A1 | 6/2010 | Prasad et al. |

(Continued)

FOREIGN PATENT DOCUMENTS

| | | |
|---|---|---|
| KR | 10-2011-0112054 A | 10/2011 |
| WO | WO 2010/002230 A2 | 1/2010 |

OTHER PUBLICATIONS

International Search Report dated Jul. 15, 2013 in connection with International Patent Application No. PCT/KR2013/002821, 3 pages.

(Continued)

*Primary Examiner* — Sai-Ming Chan

(57) ABSTRACT

A user equipment (UE) is configured to determine channel quality information (CQI) in a wireless communication system. The UE includes a processor configured to receive from an eNodeB (eNB) signaling parameters related to a first co-channel precoding matrix indicator (PMI) codebook, determine a second co-channel PMI based on a determined single user PMI (SU-PMI) and the received signaling parameters related to the first co-channel PMI codebook, determine a multi-user CQI (MU-CQI) based on the second co-channel PMI, and transmit the MU-CQI to the eNB.

24 Claims, 9 Drawing Sheets

(56) References Cited

U.S. PATENT DOCUMENTS

2010/0254474 A1 10/2010 Gomadam et al.
2011/0176629 A1 7/2011 Bayesteh et al.
2011/0200131 A1* 8/2011 Gao et al. .................. 375/267

OTHER PUBLICATIONS

Written Opinion of International Searching Authority dated Jul. 15, 2013 in connection with International Patent Application No. PCT/KR2013/002821, 5 pages.
Extended European Search dated Jul. 15, 2013 in connection with European Patent Application No. 13162331.6, 8 pages.
3GPP TSG RAN WG1 Meeting #62; R1-105379; "Multi-component feedback for CQI enhancement"; Oct. 11-15, 2010; Xian, China; 11 pages.
3GPP TSG RAN WG1 Meeting #66bis; R1-113561; "Enhancement of 4Tx feedback codebook and MU-MIMO feedback" Oct. 10-14, 2011; Zhuhai, China; 5 pages.
3GPP TSG RAN WG1 Meeting #72; R1-130745; "Discussion on scenarios for elevation beamforming and FD-MIMO" Jan. 28-Feb. 1, 2012; St. Julian's Malta; 5 pages.
Maattanen, et al; "CSI Feedback for Dynamic Switching Between Single User and Multiuser MIMO" Jan. 26, 2012; Wireless Pers Commun (2012) 64:33-49; 17 pages.

* cited by examiner

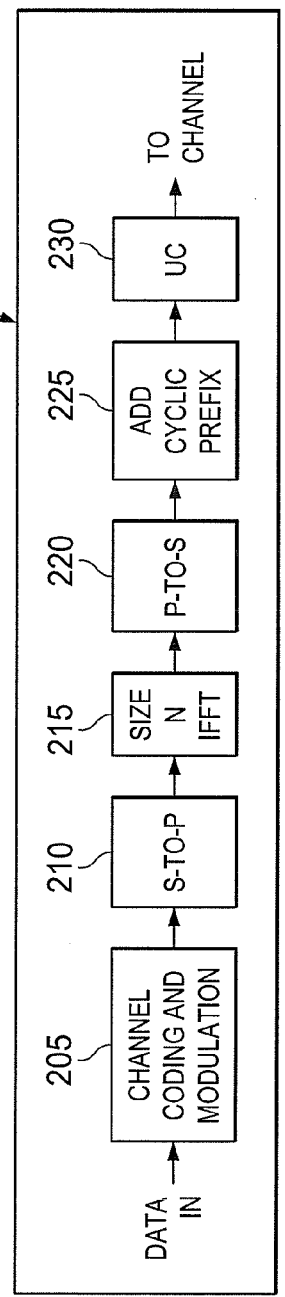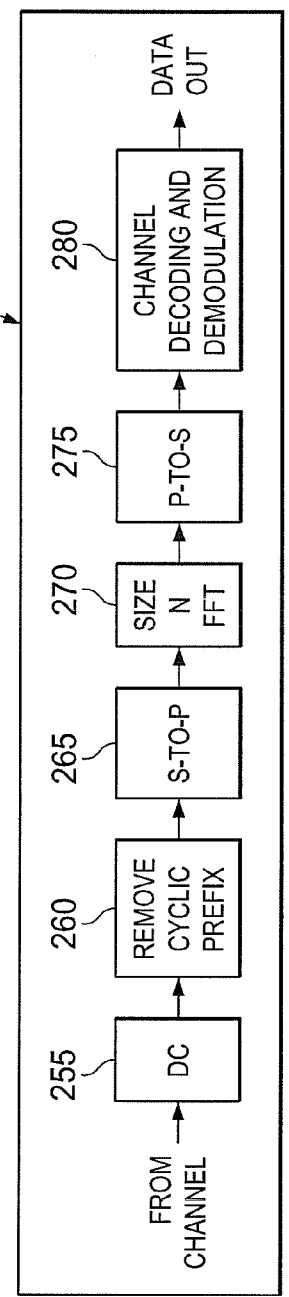

DETERMINATION OF CHANNEL QUALITY INFORMATION IN ADVANCED ANTENNA SYSTEMS

CROSS-REFERENCE TO RELATED APPLICATION(S) AND CLAIM OF PRIORITY

The present application claims priority to U.S. Provisional Patent Application Ser. No. 61/620,312 filed Apr. 4, 2012, entitled "Determination of Channel Quality Information in Advanced Antenna Systems". The content of the above-identified patent documents is incorporated herein by reference.

TECHNICAL FIELD

The present application relates generally to wireless communication and, more specifically, to a determination of channel quality information in advanced antenna systems.

BACKGROUND

Wireless communication has been one of the most successful innovations in modern history. Recently, the number of subscribers to wireless communication services exceeded 5 billion and continues to grow quickly. The demand of wireless data traffic is rapidly increasing due to growing popularity among consumers and businesses of smart phones and other mobile data devices, such as tablets, "note pad" computers, net books, and eBook readers. In order to meet the high growth in mobile data traffic, improvements in radio interface efficiency and communication technology is of paramount importance. One such improvement is the growing use of multi-user (MU) multiple-input multiple-output (MIMO) communication systems.

SUMMARY

A method of determining channel quality information (CQI) for use in a user equipment (UE) is provided. The method includes receiving from an eNodeB (eNB) signaling parameters related to a first co-channel precoding matrix indicator (PMI) codebook, determining a second co-channel PMI based on a determined single user PMI (SU-PMI) and the received signaling parameters related to the first co-channel PMI codebook, determining a multi-user CQI (MU-CQI) based on the second co-channel PMI, and transmitting the MU-CQI to the eNB.

A user equipment (UE) configured to determine CQI in a wireless communication system is provided. The UE includes a processor configured to receive from an eNB signaling parameters related to a first co-channel PMI codebook, determine a second co-channel PMI based on a determined SU-PMI and the received signaling parameters related to the first co-channel PMI codebook, determine a MU-CQI based on the second co-channel PMI, and transmit the MU-CQI to the eNB.

A method of determining CQI for use in an eNodeB is provided. The method includes transmitting signaling parameters related to a first co-channel PMI codebook to a UE, and receiving a MU-CQI from the UE. The MU-CQI is determined based on a second co-channel PMI, the second co-channel PMI based on a SU-PMI and the transmitted signaling parameters related to the first co-channel PMI codebook.

An eNodeB configured to determine CQI in a wireless communication system is provided. The eNodeB includes a processor configured to transmit signaling parameters related to a first co-channel PMI codebook to a UE, and receive a MU-CQI from the UE. The MU-CQI is determined based on a second co-channel PMI, the second co-channel PMI based on a SU-PMI and the transmitted signaling parameters related to the first co-channel PMI codebook.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates a high-level diagram of a wireless transmit path according to an embodiment of this disclosure;

FIG. 3 illustrates a high-level diagram of a wireless receive path according to an embodiment of this disclosure;

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into this disclosure as if fully set forth herein: (i) 3GPP Technical Specification No. 36.211, version 10.1.0, "E-UTRA, Physical channels and modulation" (hereinafter "REF1"); (ii) 3GPP Technical Specification No. 36.212, version 10.1.0, "E-UTRA, Multiplexing and Channel coding" (hereinafter "REF2"); and (iii) 3GPP Technical Specification No. 36.213, version 10.1.0, "E-UTRA, Physical Layer Procedures" (hereinafter "REF3").

Figure 1:
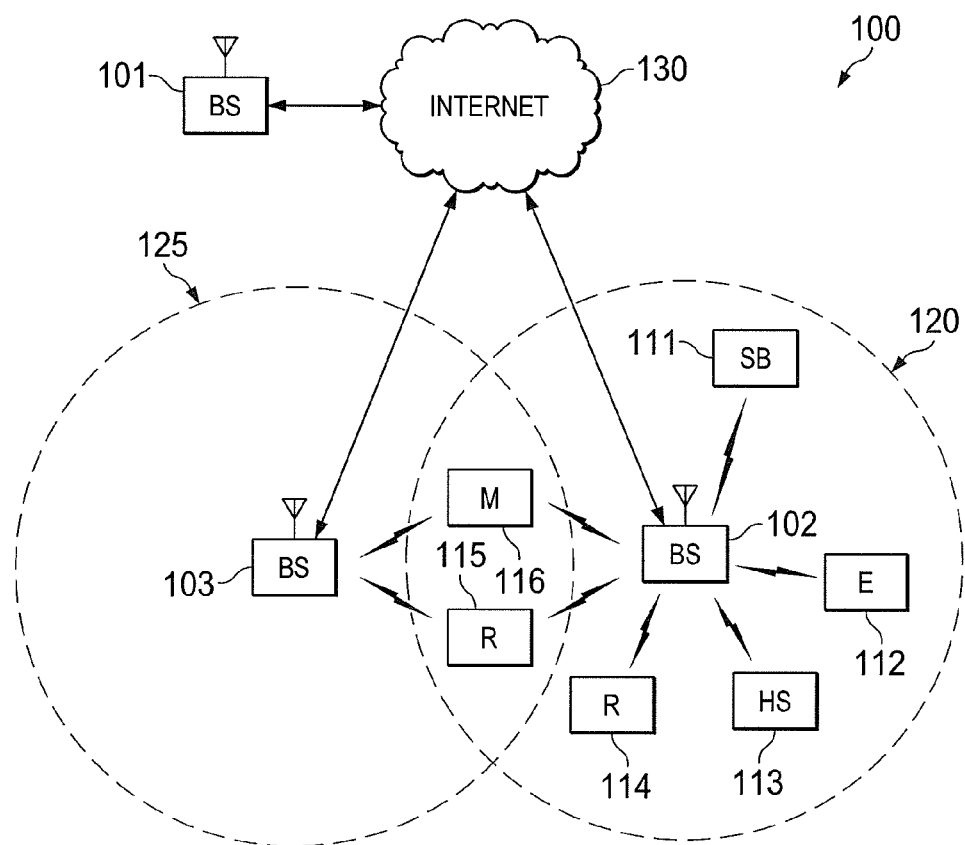
FIG. 1 illustrates a wireless network according to an embodiment of this disclosure.

FIG. 1 illustrates a wireless network 100 according to one embodiment of this disclosure. The embodiment of wireless network 100 illustrated in FIG. 1 is for illustration only. Other embodiments of wireless network 100 could be used without departing from the scope of this disclosure.

The wireless network 100 includes eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network.

Depending on the network type, other well-known terms may be used instead of "eNodeB," such as "base station" or "access point". For the sake of convenience, the term "eNodeB" shall be used herein to refer to the network infrastructure components that provide wireless access to remote terminals.

The eNB 102 provides wireless broadband access to network 130 to a first plurality of user equipments (UEs) within coverage area 120 of eNB 102. The first plurality of UEs includes UE 111, which may be located in a small business; UE 112, which may be located in an enterprise; UE 113, which may be located in a WiFi hotspot; UE 114, which may be located in a first residence; UE 115, which may be located in a second residence; and UE 116, which may be a mobile device, such as a cell phone, a wireless laptop, a wireless PDA, or the like. UEs 111-116 may be any wireless communication device, such as, but not limited to, a mobile phone, mobile PDA and any mobile station (MS).

For the sake of convenience, the term "user equipment" or "UE" is used herein to designate any remote wireless equipment that wirelessly accesses an eNB, whether the UE is a mobile device (e.g., cell phone) or is normally considered a stationary device (e.g., desktop personal computer, vending machine, etc.). In other systems, other well-known terms may be used instead of "user equipment", such as "mobile station" (MS), "subscriber station" (SS), "remote terminal" (RT), "wireless terminal" (WT), and the like.

The eNB 103 provides wireless broadband access to a second plurality of UEs within coverage area 125 of eNB 103. The second plurality of UEs includes UE 115 and UE 116. In some embodiment, eNBs 101-103 may communicate with each other and with UEs 111-116 using LTE or LTE-A techniques.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace eNBs 101-103 and UEs 111-116. Wired connections may replace the wireless connections depicted in FIG. 1.

FIG. 2 is a high-level diagram of a wireless transmit path. FIG. 3 is a high-level diagram of a wireless receive path. In FIGS. 2 and 3, the transmit path 200 may be implemented, e.g., in eNB 102 and the receive path 300 may be implemented, e.g., in a UE, such as UE 116 of FIG. 1. It will be understood, however, that the receive path 300 could be implemented in an eNB (e.g. eNB 102 of FIG. 1) and the transmit path 200 could be implemented in a UE.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2 and 3 may be implemented in software while other components may be implemented by configurable hardware (e.g., a processor) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in eNB 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel and reverse operations to those at eNB 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of eNBs 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to eNBs 101-103 and may implement a receive path corresponding to the architecture for receiving in the downlink from eNBs 101-103.

Figure 4:
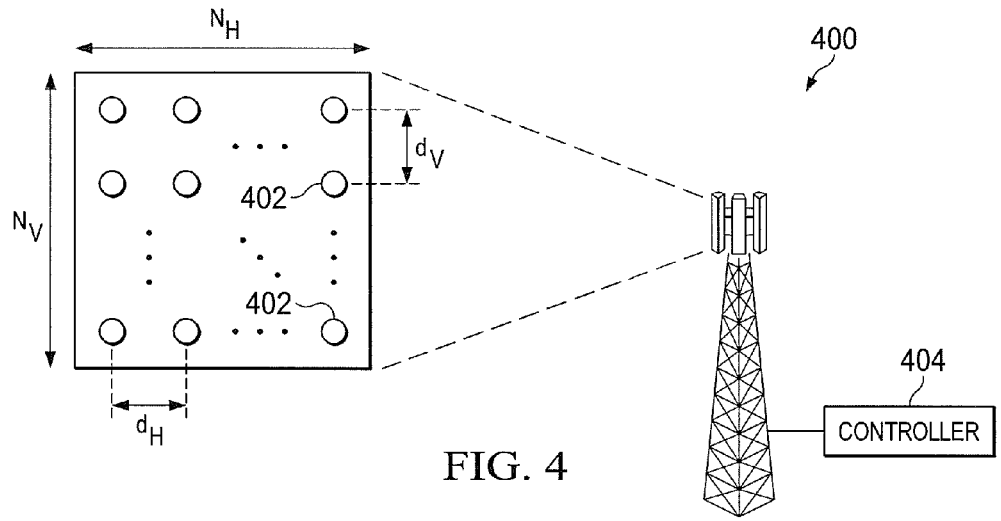
FIG. 4 illustrates a transmission point according to one embodiment of this disclosure.

FIG. 4 illustrates a transmission point according to one embodiment of this disclosure. The embodiment of transmission point 400 illustrated in FIG. 4 is for illustration only. Other embodiments of transmission point 400 could be used without departing from the scope of this disclosure.

Transmission point (TP) 400 is equipped with a two-dimensional (2D) active antenna array comprising a plurality of antenna elements 402, and is configured for multi-user multiple-input multiple-output (MU-MIMO) transmissions. In some embodiments, TP 400 may also be configured for full dimension (FD) MIMO transmissions. As used herein, the term "transmission point" refers to a network node that can transmit downlink signals and receive uplink signals in a cellular network. Examples of TPs may include base stations, NodeBs, enhanced NodeBs (eNBs), remote radio heads (RRHs), and the like. As particular examples, TP 400 may represent one or more of eNBs 101-103 of FIG. 1. An entity controlling at least one TP is called the controller, network, or eNB. As shown in FIG. 4, TP 400 includes a controller 404. Each active antenna array may have a separate base band, which can dynamically control the antenna weights in a frequency selective manner.

TP 400 includes N ($N=N_H \times N_V$) 2D active antenna elements 402, and the N antenna elements 402 are placed in a 2D grid of $N_H \times N_V$. The horizontal spacing between any two adjacent antenna elements 402 is denoted by $d_H$, and the vertical spacing between any two adjacent antenna elements 402 is denoted by $d_V$.

Figure 5:
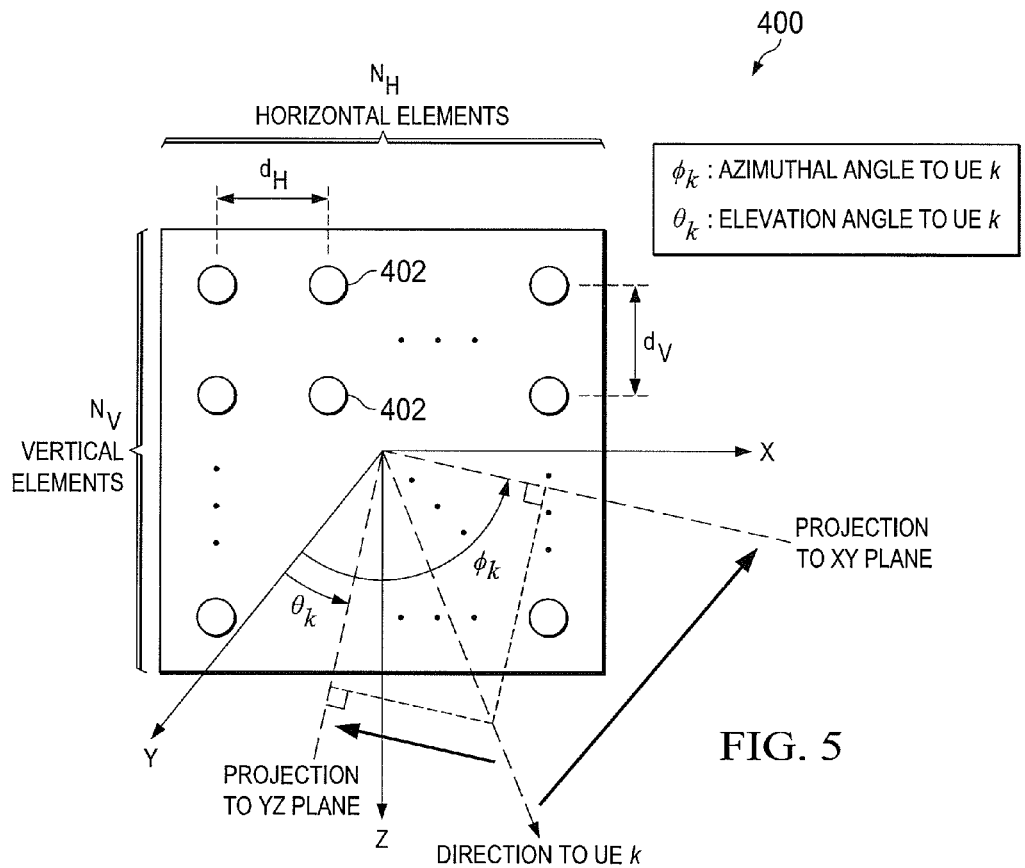
FIG. 5 illustrates azimuth and elevation angles from a transmission point to a user equipment, according to one embodiment of this disclosure.

FIG. 5 illustrates azimuth and elevation angles from transmission point 400 to a user equipment, according to one embodiment of this disclosure. The embodiment of TP 400 illustrated in FIG. 5 is for illustration only. Other embodiments could be used without departing from the scope of this disclosure.

FIG. 5 illustrates the azimuth and elevation angles to a UE k from the 2D antenna array of antenna elements of TP 400. As shown in FIG. 5, the antenna elements 402 of TP 400 are arranged in a rectangle on a XZ plane in an orthogonal XYZ coordinate system. The origin of the XYZ coordinate system is placed at the center of the rectangle. The azimuth (horizontal) angle $\phi_k$ for UE k is defined as the angle between the Y axis and the projection vector of a straight line between TP 400 and UE k to the XY plane. The elevation (vertical) angle $\theta_k$ is defined as the angle between the Y axis and the projection vector of the straight line between TP 400 and UE k to the YZ plane.

In cellular networks, the network utilizes channel state information (CSI) from UEs to schedule time-frequency resources, and to select precoders and modulation and coding schemes (MCS) for each individual UE. To facilitate the estimation of CSI at the UE, the network can configure and transmit CSI reference signals (CSI-RS). At the same time, each UE can be configured to feed back estimated precoding matrix indicators (PMI), channel quality information (CQI), and rank information (RI), by receiving and processing the CSI-RS. In many cases, the CSI feedback from the UE is primarily associated with horizontal CSI associated with the azimuth angles. For example, PMI/CQI feedback for downlink beamforming in LTE informs the eNB the horizontal direction (or the azimuth angle) in which the UE receives the strongest signal, and the associated channel strength. When active antenna array elements are introduced in the vertical domain as well, the use of vertical CSI feedback emerges.

The codebook used for feedback can be designed based on a 64-antenna MIMO system. However, it is advantageous to simplify codebook design to facilitate reasonable codebook size and acceptable computational complexity at the UE receivers. Some observations can be made regarding the channel behavior corresponding to a 2D active antenna array. The overall transmit covariance matrix corresponding to all of the 64 antennas in an 8×8 array may be separated into two components using Kronecker decompositions as an approximation, $$R_{64 \times 64} = R_{8 \times 8}^V \otimes R_{8 \times 8}^H.$$

It can be shown that the precoder can be approximated into horizontal and vertical components, $$V_{64 \times n^2} = V_{8 \times n}^V \otimes V_{8 \times n}^H.$$

where n is the rank of transmission.

In LTE Release 10, the UE feeds back a CQI in addition to the PMI and RI, which corresponds to a MCS level that can be supported reliably by the UE, with a certain target error probability. The feedback designs in LTE Release 10 are optimized for single user MIMO. PMI and CQI determined by the UE assuming single user MIMO is referred to as single user PMI (SU-PMI) and single user CQI (SU-CQI), respectively.

Figure 6:
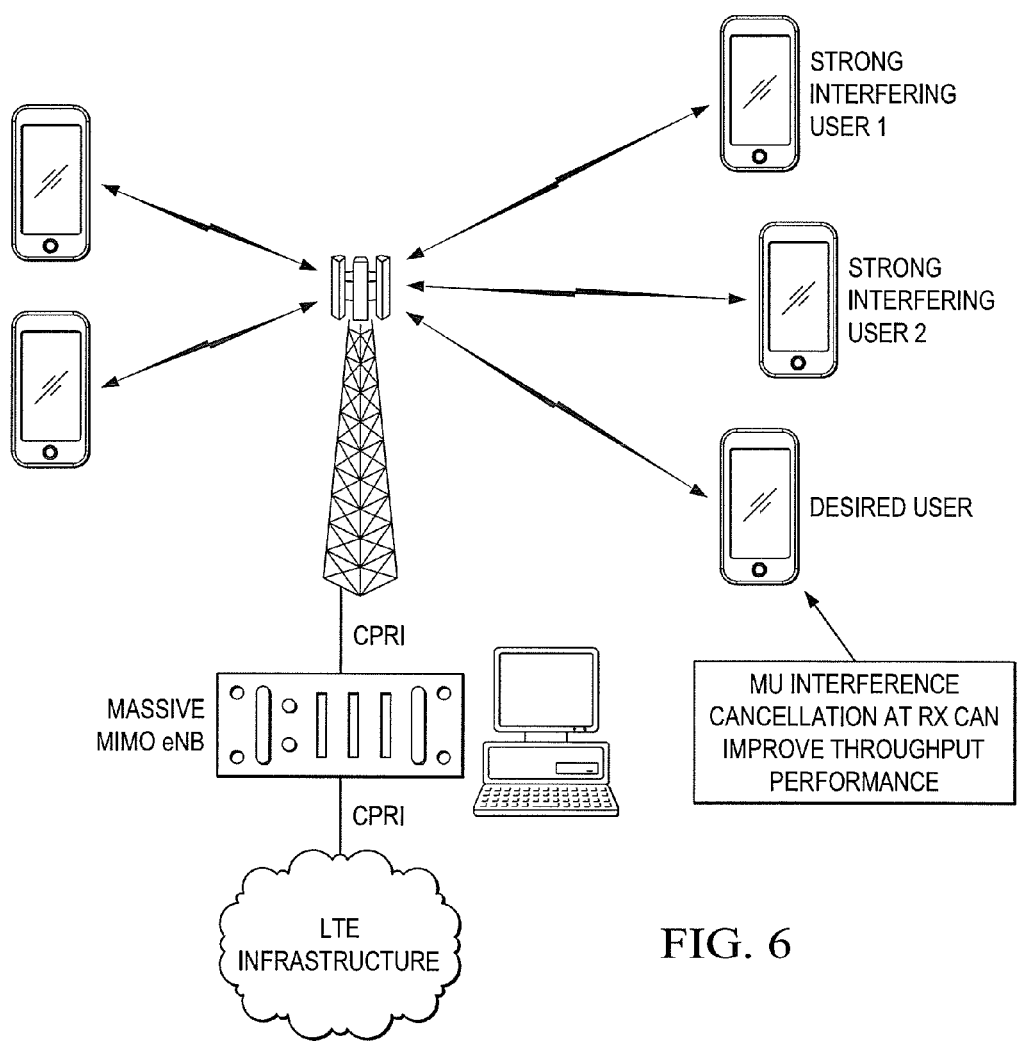
FIG. 6 illustrates an example operation of a multi-user MIMO system with a two-dimensional array, according to an embodiment of this disclosure.

FIG. 6 illustrates an example operation of a multi-user MIMO system with a two-dimensional array, according to an embodiment of this disclosure. The embodiment of the multi-user MIMO system illustrated in FIG. 6 is for illustration only. Other embodiments could be used without departing from the scope of this disclosure.

Multi-user MIMO corresponds to a transmission scheme where a transmitter can transmit data to two or more UEs at the same time/frequency resource, by relying on spatial separation of the corresponding user's channels. With a smaller number of transmit antennas, the number of users that can be supported is limited. Since the number of transmit antennas supported in LTE Release 10 is limited to a maximum of eight antennas, many designs for multi-user MIMO support are optimized for a case of two-user MU-MIMO transmission with a single stream per each UE.

However, with MU-MIMO, the MCS to be used by the scheduler for each user may need to be determined at the eNB. The MCS that can be supported reliably for each UE is dependent on co-channel PMI corresponding to the co-scheduled UE. For scheduling flexibility, a transmitter may pair a user with any other UE.

Assuming a typical configuration of two receiver antennas at the UE, single user MIMO (SU-MIMO) up to rank 2 can be supported. Further, it is expected that MU-MIMO is only scheduled by an eNB when the performance is better than the SU-MIMO. This means that scheduled users have good spatial separation. Single user CQI (SU-CQI) is an approximation of MU-CQI for determination of MCS at the eNB.

However, for MIMO with a large number of transmit antennas (e.g., number of transmit antennas is greater than number of receive antennas, or $N_T > N_R$), the spatial rank of SU-MIMO transmission is limited by the number of receive antennas. Hence, MU-MIMO is frequently used in such cases. Accordingly, methods are defined to determine MU-CQI at the UE. The eNB predictions of MCS may not be accurate since the receiver implementation-specific algorithms, like interference cancellation and suppression, also need to be accurately reflected in any MU-CQI calculation.

Following are a number of methods for computing MU-CQI in accordance with embodiments of this disclosure. The methods for computing MU-CQI will be described assuming rank 1 transmission and codebook constructions with two components. One such construction is based on the definition of an overall precoder based on individual components capturing horizontal and vertical precoding using a Kronecker product, as shown in Equation 1 below.

$$V = w^H \otimes w^V \quad \text{[Eqn. 1]}$$

The methods for computing MU-CQI disclosed below are also applicable for one-dimensional precoder codebooks, e.g. codebooks that may correspond to either horizontal or vertical precoding. A one-dimensional precoder codebook may be considered a special case of the precoder in Equation 1, where either $w^H$ or $w^V = 1$. In such a case, Equation 1 is reduced to:

$$V = w^H \text{ if } w^V = 1, \text{ or}$$

$$V = w^V \text{ if } w^H = 1.$$

In certain embodiments, 3GPP LTE Release 8/9/10 precoder codebooks may be interpreted as one-dimensional horizontal precoder codebooks, since it is commonly assumed in 3GPP that the antennas are arranged horizontally. Nevertheless, from the UE's perspective, the UE need not be aware of whether the one-dimensional precoder codebook corresponds to a horizontal or a vertical precoder codebook. It will be understood that the 3GPP LTE Rel-8/9/10 precoder codebooks may also be used for elevation precoding.

The signal model for multi-user transmission can be expressed as follows, assuming two transmit antennas and two receive antennas:

$$Y_1 = H_1 V_1 s_1 + H_1 G_1 s_2 + n_1$$

$$= \begin{bmatrix} h_{11} & h_{21} \\ h_{12} & h_{22} \end{bmatrix} \begin{bmatrix} v_{11} \\ v_{12} \end{bmatrix} s_1 + \begin{bmatrix} h_{11} & h_{21} \\ h_{12} & h_{22} \end{bmatrix} \begin{bmatrix} g_{21} \\ g_{22} \end{bmatrix} s_2 + n_1$$

where $Y_1$ is the received signal at UE1, $H_1$ is the 2×2 MIMO channel matrix at UE1, $V_1$ is the precoder applied for UE1 data symbol $s_1$, $G_1$ is the precoder applied for interfering UE2 data symbol $s_2$, and $n_1$ is the observed Additive White Gaussian Noise (AWGN) at the receiver.

More generally, the signal model for multi-user transmission can be expressed as:

$$Y_1 = H_1 V_1 s_1 + H_1 G_I s_I + n_1$$

where $G_I = [G_2, G_3, \ldots G_{N_I}]$ is the precoding vector corresponding to data symbols that are transmitted to other users $s_I = [s_2, s_3, \ldots s_{N_I}]$.

Clearly, the most accurate estimate of MU-CQI can be achieved if the transmitter (eNB) and receiver (UE) are aligned on the assumption of co-channel PMI $G_I$. However, with multi-user scheme support at the eNB, a scheduler determines the user grouping for MU transmission based on the channel state feedback received from all UEs, the data requirements of each user, and other fairness metrics. A UE receiver may not be able to exactly predict the co-channel PMI used for MU transmission, and hence, it may not be feasible to account for the co-channel PMI exactly in the CQI calculation.

One possibility is for the eNB to explicitly indicate such precoder information in advance for MU-CQI calculation. This method has some disadvantages. It reduces the dynamic scheduling flexibility since the scheduler needs to reserve resources and determine scheduling parameters ahead of time. Further due to possible limitations on the amount of signaling overhead that can be supported on the downlink, the co-channel PMI cannot be indicated too often, or be indicated in a frequency selective manner.

Figure 7:
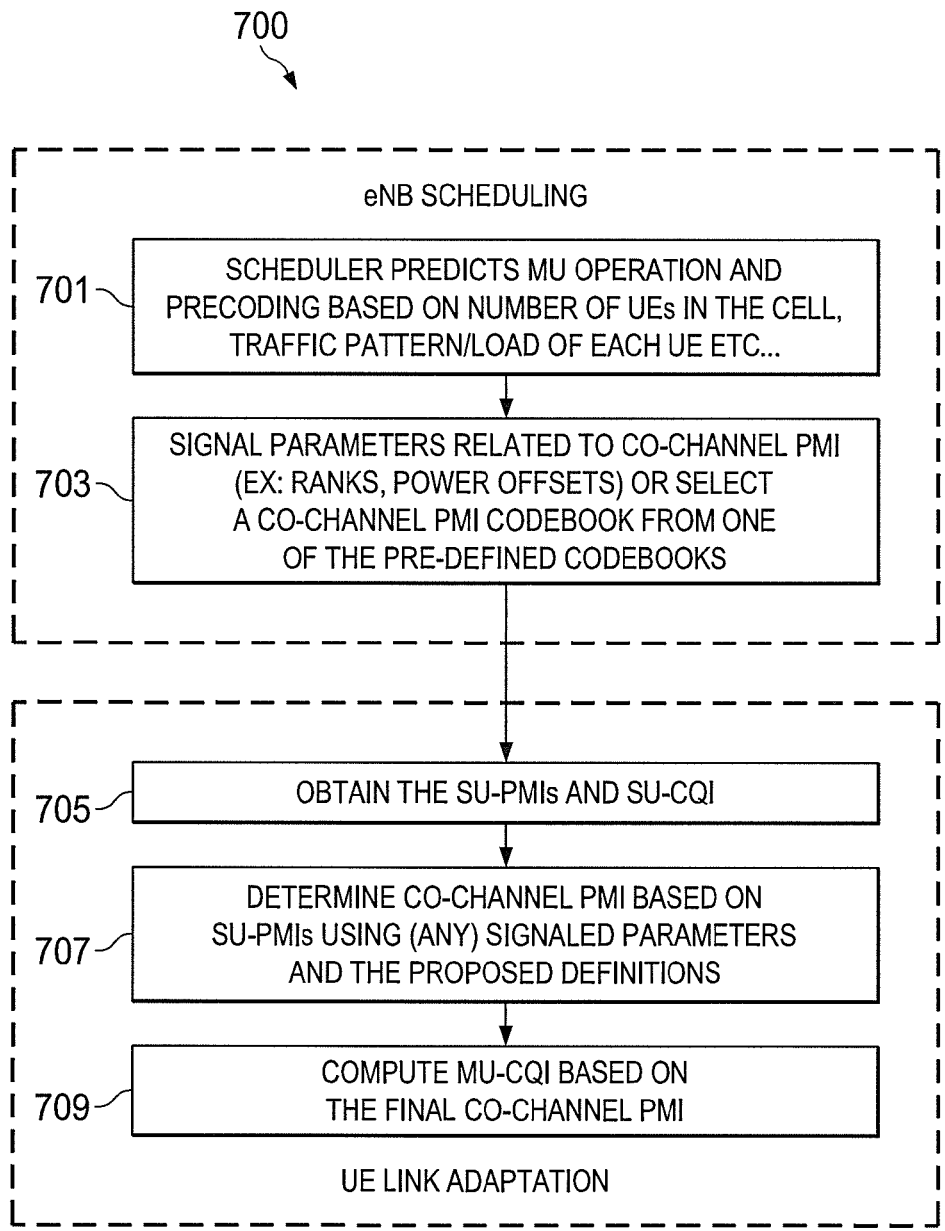
FIG. 7 illustrates an example method for determining a co-channel precoding matrix indicator (PMI) and determining multi-user channel quality information (MU-CQI), according to an embodiment of this disclosure.

FIG. 7 illustrates an example method for determining co-channel PMI and determining MU-CQI, according to an embodiment of this disclosure. The embodiment of method 700 illustrated in FIG. 7 is for illustration only. Other embodiments of method 700 could be used without departing from the scope of this disclosure.

Method 700 describes the procedure at the eNB and UE side for supporting MU-CQI in a network. Initially, in operation 701, an eNB scheduler predicts MU operation and precoding based on the channel feedback received from the users, the number of users in the cell, the available resources, data requirements or traffic patterns at the users, and the like. More specifically, the eNB scheduler determines the number of UEs that may be paired together or the number of UEs that may be paired with a particular UE. In some embodiments, the eNB scheduler determines the individual powers that may be applied to each user, or equivalently, the power offsets of one or more interfering precoders relative to the precoder of a UE.

In operation 703, the eNB signals the information of one or more of the UEs that may be paired together, or the number of UEs that may be paired with a particular UE. In an embodiment, the eNB determines the individual powers that may be applied to each user, or equivalently, the power offsets of one or more interfering precoders relative to the precoder of a UE. In an embodiment, the eNB may signal this information as a total rank that applies to the transmit PMI, rank of co-channel interference, relative powers, power offsets, or individual powers applied to the UE precoder or interfering precoders. In another embodiment, the eNB may also signal information that includes a selection from two or more of the pre-defined co-channel PMI codebooks. The eNB may also signal similar rank and power scaling information corresponding to the one or more of the horizontal and vertical components of the transmit PMI.

In operation 705, the UE receiver may determine a single user PMI (SU-PMI) and SU-CQI assuming no co-channel interference along with an associated rank. In operation 707, the UE determines the co-channel PMI based on one or more of the determined SU-PMI, and some of the signaled parameters from the eNB. The signaled parameters may include a total rank that applies to the transmit PMI, rank of co-channel interference, relative powers, power offsets, or individual powers applied to the UE precoder or interfering precoders, or rank and power scaling information corresponding to the one or more of the horizontal and vertical components of the transmit PMI.

In operation 709, the UE computes the MU-CQI based on the final co-channel PMI.

Figure 8:
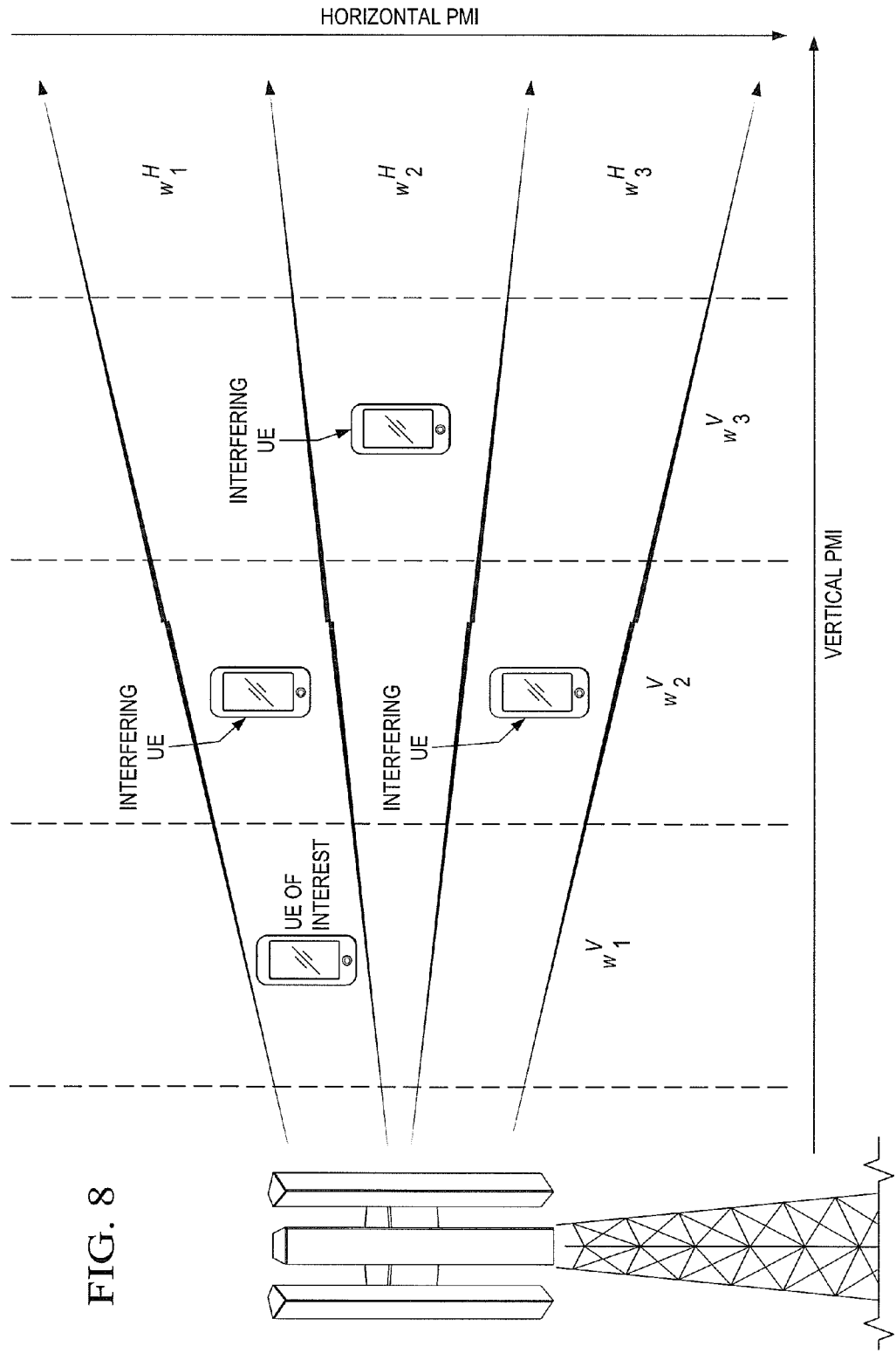
FIGS. 8 through 11 illustrate examples of co-channel interference in MU-MIMO with a 2D array, according to embodiments of this disclosure.

FIG. 8 illustrates an example of co-channel interference in MU-MIMO with a 2D array, according to an embodiment of this disclosure. The embodiment illustrated in FIG. 8 is for illustration only. Other embodiments could be used without departing from, the scope of this disclosure.

As shown in FIG. 8, orthogonal partitioning is performed in both the vertical and horizontal subspaces, where each of the subspaces is characterized by multiple horizontal or vertical codewords (or precoders). In the example in FIG. 8, three partitions in each of the horizontal and vertical domains are depicted. In other embodiments, more or fewer partitions could be used in either domain. The partitioning is based on horizontal codewords $\{w_1^H, w_2^H, w_3^H\}$ and vertical codewords $\{w_1^V, w_2^V, w_3^V\}$. For simplicity of discussion, an embodiment will first be described where the codebook for the single user PMI (SU-PMI) is the same as that determined by the partitions shown in FIG. 8; that is, the codebook is the same as $\{w_1^H, w_2^H, w_3^H\}$ for the horizontal PMI and $\{w_1^V, w_2^V, w_3^V\}$ for vertical PMI. One motivation to use fewer codewords to determine partitions could be to limit the size of the co-channel PMI.

In FIG. 8, a UE of interest is depicted in the $w_1^H$ horizontal partition and the $w_1^V$ vertical partition. The intersection of a particular horizontal partition and a particular vertical partition may be referred to as a dimension. Thus, the UE of interest is depicted in dimension $(w_1^H, w_1^V)$. Multiple interfering UEs are depicted in other dimensions. In particular, as shown in FIG. 8, three interfering UEs are depicted in dimensions $(w_1^H, w_2^V)$, $(w_3^H, w_2^V)$, and $(w_2^H, w_3^V)$. The PMI selected by the UE of interest for a single user transmission with a two-component codebook design can be expressed as:

$$F = w_1^H \otimes w_1^V.$$

Also, in accordance with the illustration in FIG. 8, the transmit PMI corresponding to all users can be expressed as:

$$U=[FG]=[w_1^H \otimes w_1^V, w_1^H \otimes w_2^V, w_3^H \otimes w_2^V, w_2^H \otimes w_3^V]$$

where the co-channel PMI G based on the partitions of the interfering UEs and is given by:

$$G=[w_1^H \otimes w_2^V, w_3^H \otimes w_2^V, w_2^H \otimes w_3^V].$$

The UE determines the self-PMI F, while the co-channel PMI G is determined at the scheduler.

An example for one-dimensional orthogonal partitioning can be easily constructed by taking either $w_i^H$ or $w_i^V$ for all i to be 1. It will be understood that other embodiments disclosed herein can be easily extended to the one-dimensional orthogonal partitioning by taking either $w_i^H$ or $w_i^V$ for all i to be 1.

In an embodiment, if the whole transmit PMI is known to the UE, the determination of MU-CQI is straightforward and can be based on the total transmit precoder U. In embodiments with power normalized to unity and equal power allocation to all transmitted data symbols, the transmit precoder can be expressed as:

$$U = \left[\sqrt{\frac{1}{4}}F \sqrt{\frac{1}{4}}G\right] = \left[\sqrt{\frac{1}{4}}w_1^H \otimes w_1^V, \sqrt{\frac{1}{4}}w_1^H \otimes w_2^V, \sqrt{\frac{1}{4}}w_3^H \otimes w_2^V, \sqrt{\frac{1}{4}}w_2^H \otimes w_3^V\right]$$

where the individual vectors are normalized to unity (e.g., $\|w_1^H \otimes w_1^V\|^2 = 1$). More generally, the precoders can be expressed as:

$$U=[\sqrt{P_s}F \sqrt{P_c}G]$$

where the power offsets $(P_s, P_c)$ reflect the power offset for the signal and the interference, respectively. The actual power is $\{r_s P_s, r_c P_c\}$, and $\{r_s, r_c\}$ are the ranks of the self-PMI and the co-channel PMI, respectively. In a standard embodiment, $r_s P_s + r_c P_c = 1$, where the unit power normalization refers to maximum power utilization at the eNB transmitter power amplifier.

In the following embodiments, methods are provided to determine a co-channel PMI at the UE without exact knowledge of the co-channel PMI used. In some of the following embodiments, power normalization or allocation will not be explicitly addressed. Instead, some of the following embodiments focus on the spatial vectors. However, it will be understood that similar normalizations can apply.

Figure 9:
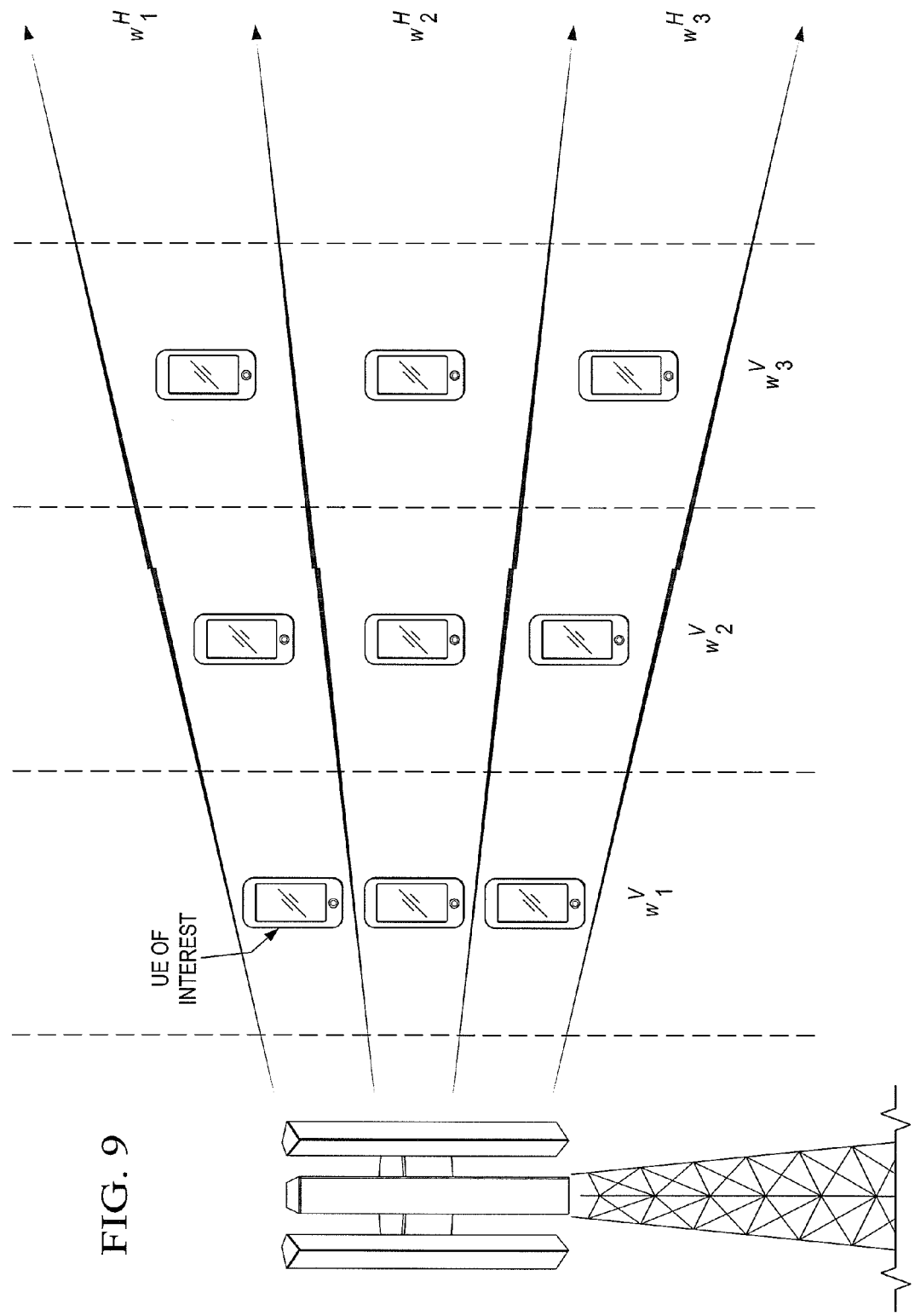

FIG. 9 illustrates another example of co-channel interference in MU-MIMO with a 2D array, according to an embodiment of this disclosure. The embodiment illustrated in FIG. 9 is for illustration only. Other embodiments could be used without departing from the scope of this disclosure.

In a method in accordance with FIG. 9, all of the possible orthogonal dimensions are used to define a co-channel PMI. That is, every dimension that is orthogonal to the dimension of the UE of interest $(w_1^H, w_1^V)$ is used to define the co-channel PMI, as follows:

$$G=W_\perp^H \otimes W^V \cup W^H \otimes W_\perp^V$$

where
$W^H=\{w_1^h, w_2^h, w_3^h\}, W^V=\{w_1^v, w_2^v, w_3^v\}$
$W_\perp^H=\{w_2^h, w_3^h\}, W_\perp^V=\{w_2^v, w_3^v\}$ It can be seen that G includes eight unique vectors—one for each of the eight dimensions that are orthogonal to the dimension of interest $(w_1^H, w_1^V)$. The MU CQI is determined assuming G as the co-channel PMI.

Figure 10:
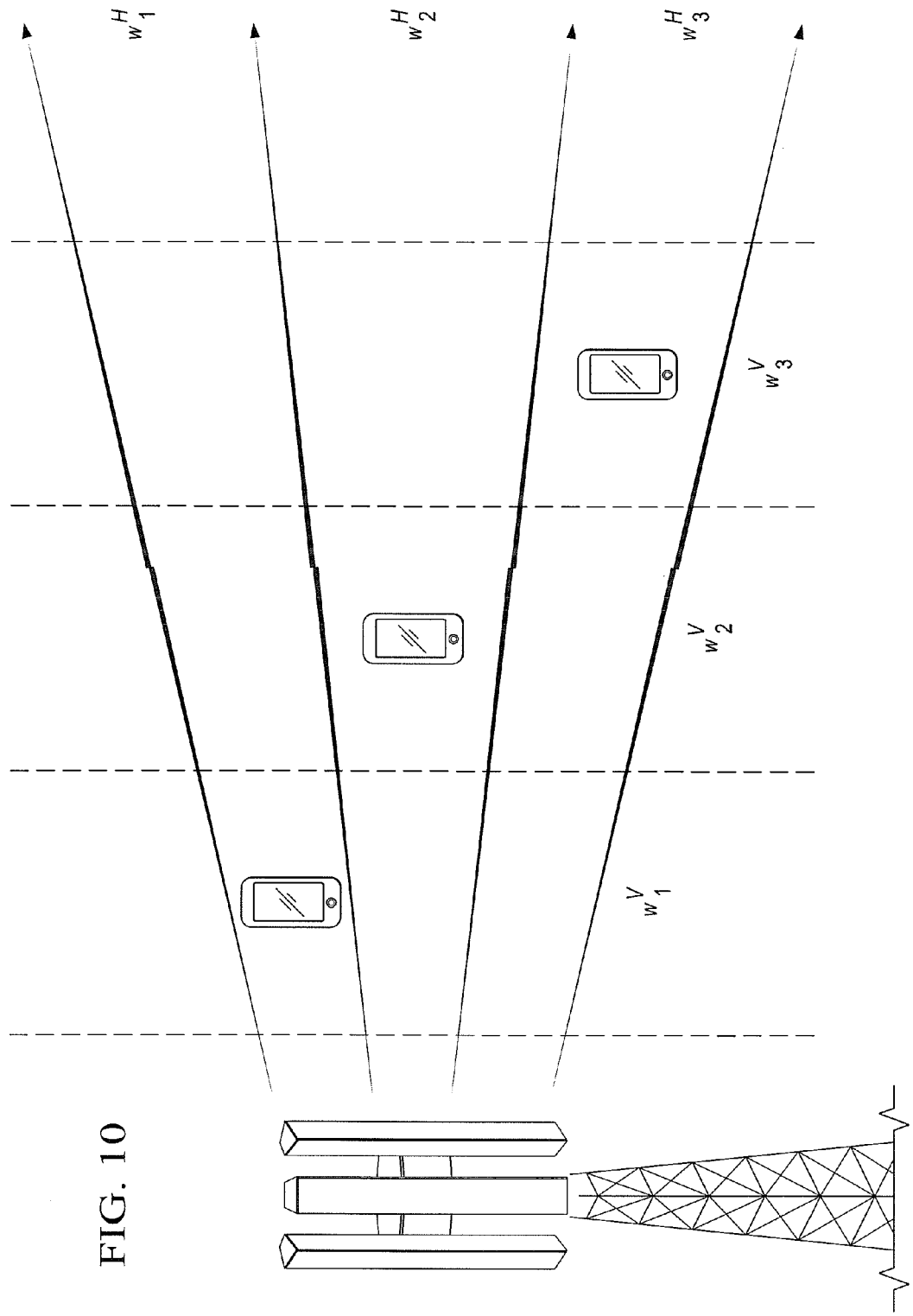

FIG. 10 illustrates yet another example of co-channel interference in MU-MIMO with a 2D array, according to an embodiment of this disclosure. The embodiment illustrated in FIG. 10 is for illustration only. Other embodiments could be used without departing from the scope of this disclosure.

In accordance with FIG. 10, the UE assumes that the scheduler selects the UEs for MU transmission such that no two UEs overlap in either the horizontal domain or the vertical domain. That is, the UEs selected for MU transmission have both a unique horizontal partition and a unique vertical partition, as shown in FIG. 10. In other words, neither their horizontal PMIs nor vertical PMIs are the same. In this case, the co-channel PMI may, for example, be determined as:

$$G=[w_2^h \otimes w_2^v, w_3^h \otimes w_3^v]$$

where the Kronecker product of the individual components is taken such that each component index is used only once. This can help limit the rank of the co-channel PMI and MU-CQI computational complexity at the UE.

In one example, a mapping table may be defined as shown in Table 1 to derive the co-channel PMI G from the self-PMI F.

TABLE 1

Example of determining the co-channel PMI G from the self-PMI F according to a codebook

| (H-PMI index, V-PMI index) for F | H-PMI and V-PMI indices for columns of G |
|---|---|
| (1, 1) | [(2, 2), (3, 3)] |
| (2, 2) | [(1, 1), (3, 3)] |
| (3, 3) | [(1, 1), (2, 2)] |
| (1, 2) | [(2, 1), (3, 3)] |
| (1, 3) | [(2, 2), (3, 1)] |
| (2, 1) | [(1, 2), (3, 3)] |
| (2, 3) | [(1, 1), (3, 2)] |

TABLE 1-continued

Example of determining the co-channel PMI G from
the self-PMI F according to a codebook

| (H-PMI index, V-PMI index) for F | H-PMI and V-PMI indices for columns of G |
|---|---|
| (3, 1) | [(2, 2), (1, 3)] |
| (3, 2) | [(1, 1), (2, 3)] |

Figure 11:
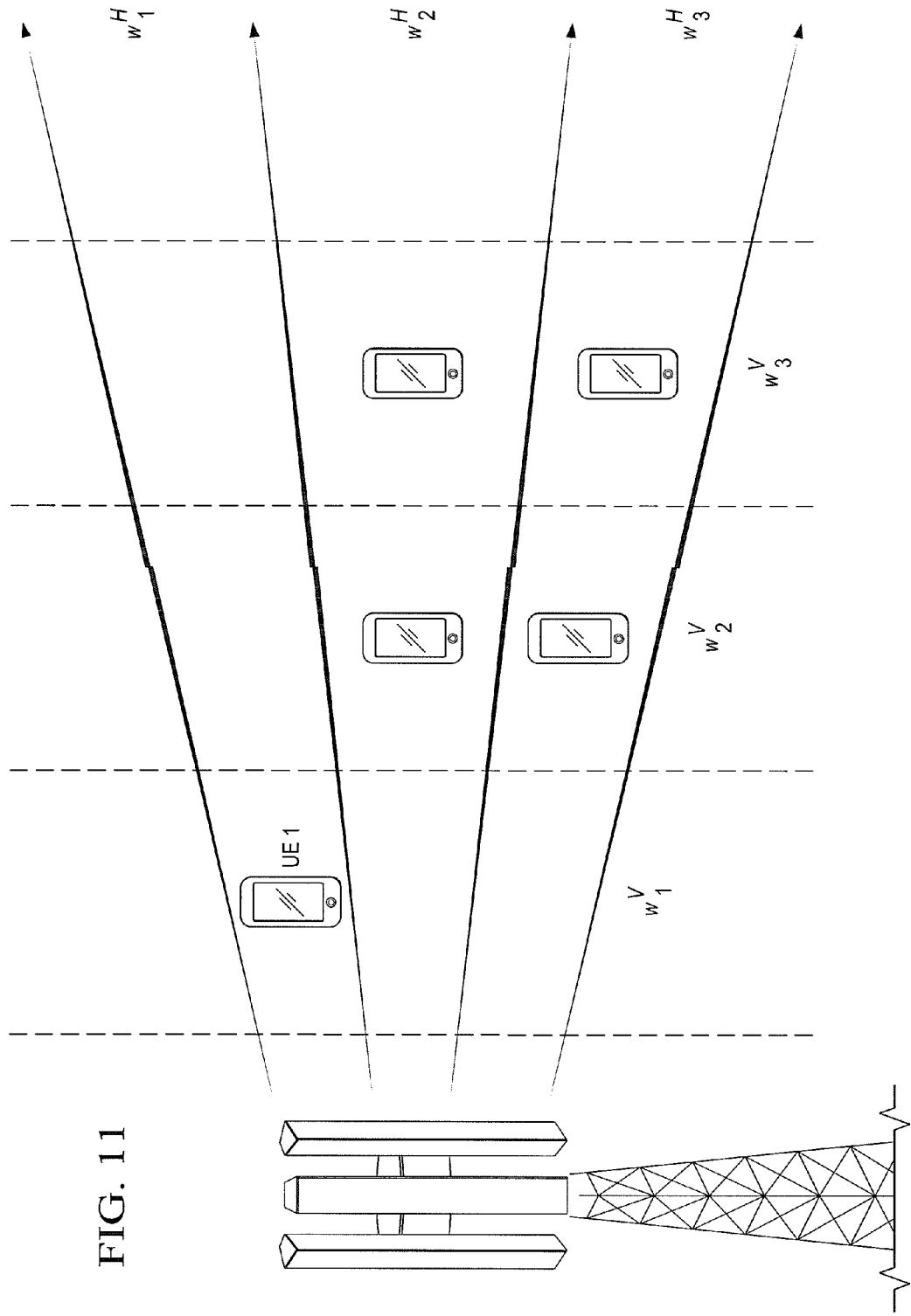

FIG. 11 illustrates still another example of co-channel interference in MU-MIMO with a 2D array, according to an embodiment of this disclosure. The embodiment illustrated in FIG. 11 is for illustration only. Other embodiments could be used without departing from the scope of this disclosure.

In accordance with FIG. 11, the scheduler groups the UEs for MU transmission such that UE 1 (the UE performing the MU-CQI computation) can assume that no other interfering UEs overlap either in the horizontal or vertical domains with UE 1 itself. In this case, the co-channel PMI may be written as:

$$G = W_\perp^H \otimes W_\perp^V.$$

More generally, if the single user PMI (SU-PMI) is determined as $F = w_m^H \otimes w_n^V$, the determination of the co-channel PMI can be expressed as follows where the columns of co-channel PMI G are obtained as a subset of columns of the orthogonal space of PMI F:

$$F_\perp = \{w_i \otimes w_j, (i,j) \neq (m,n)\}.$$

$$G(F) \subseteq F_\perp$$

In an embodiment, the actual codebook may be different from the co-channel PMI codebook design. In one example, the actual codebook may be larger than the co-channel PMI codebook. In a particular example, consider that the actual codebook for SU-PMI is a 4-bit codebook with 16 entries. This codebook may be denoted as follows:

$$V = v_i^H \otimes v_j^V, i,j \in \{1, 2, \ldots 16\}.$$

The SU-PMI H and V components may first be mapped to the corresponding partitions of the H and V components (m,n) in the above embodiments such than an equivalent or the subsampled PMI $F = w_m^H \otimes w_n^V$ can be determined. To obtain the co-channel PMI G from F, the same methods can then be applied.

TABLE 2

Determining the PMI indices of the partition (or
subsampled PMI) from the codebook index

| (H-PMI index, V-PMI index) for V | H-PMI and F-PMI indices for F |
|---|---|
| (1, 1) | (1, 1) |
| (1, 2) | (1, 1) |
| (1, 3) | (1, 1) |
| (1, 4) | (1, 1) |
| (1, 5) | (1, 1) |
| (1, 6) | (1, 2) |
| ... | ... |
| (1, 16) | (1, 3) |
| (2, 1) | (1, 1) |
| ... | ... |
| (2, 16) | (1, 3) |
| ... | ... |
| (16, 16) | (3, 3) |

Equivalently, a simple subsampling rule may be defined to map the individual indices.

A mapping table may be defined to derive the co-channel PMI G from the subsampled SU-PMI F. Table 3 shows one example.

TABLE 3

Mapping table to derive (all the columns of) the
co-channel PMI G from the subsampled SU-PMI F

| (H-PMI index, V-PMI index) for F | H-PMI and V-PMI indices for columns of G |
|---|---|
| (1, 1) | [(2, 2), (3, 3)] |
| (2, 2) | [(1, 1), (2, 3)] |
| ... | ... |

A mapping table or relationship may be defined for each of the horizontal and vertical PMIs. For example, Table 4 illustrates a mapping for horizontal PMI. A mapping table for vertical PMI could be similar to Table 4.

TABLE 4

Mapping table from H-PMI for F to H-PMI for G

| H-PMI index for F | H-PMI indices for G |
|---|---|
| 1 | [2, 3] |
| 2 | [3, 1] |
| 3 | [1, 2] |

The co-channel PMI can then be derived from the H-PMI and V-PMI indices.

In an embodiment, a mapping table or relationship may be defined for mapping the H-PMI and V-PMI indices of the SU-PMI V directly to the H-PMI and V-PMI indices of G. Table 5 shows one example.

TABLE 5

Mapping the H-PMI and V-PMI indices of the
SU-PMI V directly to the H-PMI and V-PMI indices of G

| (H-PMI index, V-PMI index) for V | H-PMI and V-PMI indices for columns of G |
|---|---|
| (1, 1) | [(2, 2), (3, 3)] |
| (2, 2) | [(2, 2), (3, 3)] |
| ... | ... |
| (10, 10) | [(1, 1), (3, 3)] |
| ... | ... |
| (16, 16) | [(1, 1), (2, 2)] |

In an embodiment, a mapping table or relationship may be defined for mapping the H-PMI (and V-PMI respectively) of the SU-PMI to the H-PMI indices (and V-PMI indices respectively) of co-channel PMI G. The co-channel PMI may then be derived from the H-PMI and V-PMI indices. Table 6 shows one example.

TABLE 6

Mapping table from H-PMI for V to H-PMI for G

| H-PMI index for V | H-PMI indices for G |
|---|---|
| 1 | [2, 3] |
| 2 | [2, 3] |
| 3 | [2, 3] |
| ... | ... |
| 10 | [1, 3] |

TABLE 6-continued

Mapping table from H-PMI for V to H-PMI for G

| H-PMI index for V | H-PMI indices for G |
|---|---|
| ... | ... |
| 16 | [(1, 1), (2, 2)] |

It is noted that the example tables shown above are provided for illustration purposes of the underlying principles, and do not necessarily corresponding to any particular optimized design. Different size of codebooks for each of the PMIs and the components may be used along with different associated mappings.

In each of the above-described embodiments, the power allocation among the PMIs F and G can be assumed to be equally distributed across all streams. Alternatively, the power allocation can be assumed to be equal among all the interfering streams, but not equal to that of the desired UE precoder. In such a case, the PMI can be expressed as follows:

$$U = [\sqrt{P_s} F \sqrt{P_c} G].$$

The actual power allocation is $\{r_s P_s, r_c P_c\}$, where $\{r_s, r_c\}$ are the ranks of the subsampled PMI F and the co-channel PMI G. Typically, $r_s P_s + r_c P_c = 1$, where the unit power normalization refers to maximum power utilization at the eNB transmitter power amplifier.

In an embodiment, the UE may determine separate ranks and power offsets of the individual H-PMIs and V-PMIs of the co-channel PMI G based on one or more configuration parameters from the network. The final power allocation is selected to normalize the total transmit PMI power.

The methods described herein may be extended to transmissions with a rank >1. For example, co-channel PMIs may be considered excluding all the r precoding vectors used for rank-r precoding to a UE for determining the co-channel PMI components. Generalized mapping rules may also be defined taking into account the r precoding vectors. Further, co-channel PMI mapping may be defined as a function of the rank-r of the user PMI, since a higher rank UE may receive transmissions simultaneously along with many co-scheduled UEs.

An example of co-channel PMI codebook construction using the methods disclosed herein is illustrated below, assuming one-dimensional precoding. Suppose that the precoder codebook is the 3GPP LTE 4 Tx codebook as shown in Table 7. An example of the co-channel PMI codebook is as shown in Table 8, assuming rank-1 transmission is preferred by the UE. The co-channel PMI codebook reflects the orthogonal dimension to the selected precoder and captures an average MU-CQI that is likely to be seen in eNB scheduling.

Although the present disclosure has been described with an exemplary embodiment, various changes and modifications may be suggested to one skilled in the art. It is intended that the present disclosure encompass such changes and modifications as fall within the scope of the appended claims.

TABLE 7

Codebook for transmission on antenna ports {0, 1, 2, 3} and for CSI reporting based on antenna ports {0, 1, 2, 3} or {15, 16, 17, 18}.

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

TABLE 8

An example of co-channel PMI codebook construction assuming the 3GPP LTE Rel-8 4 Tx codebook

| SU MIMO rank-1 PMI | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Interfering rank-1 PMIs assumed for CQI calculation (co-channel PMI) | 1, 2, 3 | 2, 3, 0 | 3, 0, 1 | 0, 1, 2 | 5, 6, 7 | 6, 7, 4 | 7, 4, 5 | 4, 5, 6 | 9, 10, 11 | 10, 11, 8 | 11, 8, 9 | 8, 9, 10 | 13, 14, 15 | 14, 15, 12 | 15, 12, 13 | 12, 13, 14 |

What is claimed is:

1. For use in a user equipment (UE) in a wireless communication system, a method of determining channel quality information (CQI), the method comprising:
   receiving from an eNodeB (eNB) signaling parameters related to a first co-channel precoding matrix indicator (PMI) codebook;
   determining a second co-channel PMI based on a determined single user PMI (SU-PMI) and the received signaling parameters related to the first co-channel PMI codebook;
   determining a multi-user CQI (MU-CQI) based on the second co-channel PMI; and
   transmitting the MU-CQI to the eNB.

2. The method of claim 1, wherein the first co-channel PMI codebook is selected from a plurality of predefined co-channel PMI codebooks.

3. The method of claim 2, wherein the UE is associated with a first dimension among a plurality of dimensions and the first co-channel PMI codebook comprises a vector for each of the dimensions that is orthogonal to the first dimension.

4. The method of claim 2, wherein the UE is associated with a first dimension among a plurality of dimensions, the first dimension comprising an intersection of a first partition in a horizontal domain and a first partition in a vertical domain, and the first co-channel PMI codebook comprises a vector for each of a subset of the dimensions that do not overlap with each other or with the first dimension in either the horizontal domain or the vertical domain.

5. The method of claim 2, wherein the UE is associated with a first dimension among a plurality of dimensions, the first dimension comprising an intersection of a first partition in a horizontal domain and a first partition in a vertical domain, and the first co-channel PMI codebook comprises a vector for each of a subset of the dimensions that do not overlap with the first dimension in either the horizontal domain or the vertical domain.

6. The method of claim 1, wherein the wireless communication system is a full dimension multiple-input multiple-output (FD-MIMO) system.

7. A user equipment (UE) configured to determine channel quality information (CQI) in a wireless communication system, the UE comprising:
   a processor configured to:
      receive from an eNodeB (eNB) signaling parameters related to a first co-channel precoding matrix indicator (PMI) codebook;
      determine a second co-channel PMI based on a determined single user PMI (SU-PMI) and the received signaling parameters related to the first co-channel PMI codebook;
      determine a multi-user CQI (MU-CQI) based on the second co-channel PMI; and
      transmit the MU-CQI to the eNB.

8. The UE of claim 7, wherein the first co-channel PMI codebook is selected from a plurality of predefined co-channel PMI codebooks.

9. The UE of claim 8, wherein the UE is associated with a first dimension among a plurality of dimensions and the first co-channel PMI codebook comprises a vector for each of the dimensions that is orthogonal to the first dimension.

10. The UE of claim 8, wherein the UE is associated with a first dimension among a plurality of dimensions, the first dimension comprising an intersection of a first partition in a horizontal domain and a first partition in a vertical domain, and the first co-channel PMI codebook comprises a vector for each of a subset of the dimensions that do not overlap with each other or with the first dimension in either the horizontal domain or the vertical domain.

11. The UE of claim 8, wherein the UE is associated with a first dimension among a plurality of dimensions, the first dimension comprising an intersection of a first partition in a horizontal domain and a first partition in a vertical domain, and the first co-channel PMI codebook comprises a vector for each of a subset of the dimensions that do not overlap with the first dimension in either the horizontal domain or the vertical domain.

12. The UE of claim 7, wherein the wireless communication system is a full dimension multiple-input multiple-output (FD-MIMO) system.

13. For use in an eNodeB in a wireless communication system, a method of determining channel quality information (CQI), the method comprising:
   transmitting signaling parameters related to a first co-channel precoding matrix indicator (PMI) codebook to a user equipment (UE); and
   receiving a multi-user CQI (MU-CQI) from the UE,
   wherein the MU-CQI is determined based on a second co-channel PMI, the second co-channel PMI based on a single user PMI (SU-PMI) and the transmitted signaling parameters related to the first co-channel PMI codebook.

14. The method of claim 13, wherein the first co-channel PMI codebook is selected from a plurality of predefined co-channel PMI codebooks.

15. The method of claim 14, wherein the UE is associated with a first dimension among a plurality of dimensions and the first co-channel PMI codebook comprises a vector for each of the dimensions that is orthogonal to the first dimension.

16. The method of claim 14, wherein the UE is associated with a first dimension among a plurality of dimensions, the first dimension comprising an intersection of a first partition in a horizontal domain and a first partition in a vertical domain, and the first co-channel PMI codebook comprises a vector for each of a subset of the dimensions that do not overlap with each other or with the first dimension in either the horizontal domain or the vertical domain.

17. The method of claim 14, wherein the UE is associated with a first dimension among a plurality of dimensions, the first dimension comprising an intersection of a first partition in a horizontal domain and a first partition in a vertical domain, and the first co-channel PMI codebook comprises a vector for each of a subset of the dimensions that do not overlap with the first dimension in either the horizontal domain or the vertical domain.

18. The method of claim 13, wherein the wireless communication system is a full dimension multiple-input multiple-output (FD-MIMO) system.

19. An eNodeB configured to determine channel quality information (CQI) in a wireless communication system, the eNodeB comprising:
   a processor configured to:
      transmit signaling parameters related to a first co-channel precoding matrix indicator (PMI) codebook to a user equipment (UE); and
      receive a multi-user CQI (MU-CQI) from the UE,
      wherein the MU-CQI is determined based on a second co-channel PMI, the second co-channel PMI based on a single user PMI (SU-PMI) and the transmitted signaling parameters related to the first co-channel PMI.

20. The eNodeB of claim 19, wherein the first co-channel PMI codebook is selected from a plurality of predefined co-channel PMI codebooks.

21. The eNodeB of claim 20, wherein the UE is associated with a first dimension among a plurality of dimensions and the first co-channel PMI codebook comprises a vector for each of the dimensions that is orthogonal to the first dimension.

22. The eNodeB of claim 20, wherein the UE is associated with a first dimension among a plurality of dimensions, the first dimension comprising an intersection of a first partition in a horizontal domain and a first partition in a vertical domain, and the first co-channel PMI codebook comprises a vector for each of a subset of the dimensions that do not overlap with each other or with the first dimension in either the horizontal domain or the vertical domain.

23. The eNodeB of claim 20, wherein the UE is associated with a first dimension among a plurality of dimensions, the first dimension comprising an intersection of a first partition in a horizontal domain and a first partition in a vertical domain, and the first co-channel PMI codebook comprises a vector for each of a subset of the dimensions that do not overlap with the first dimension in either the horizontal domain or the vertical domain.

24. The eNodeB of claim 19, wherein the wireless communication system is a full dimension multiple-input multiple-output (FD-MIMO) system.

\* \* \* \* \*